RECORD-PLAYBACK SYSTEM FOR MAGNETIC RECORDING
Filed Aug. 19, 1953
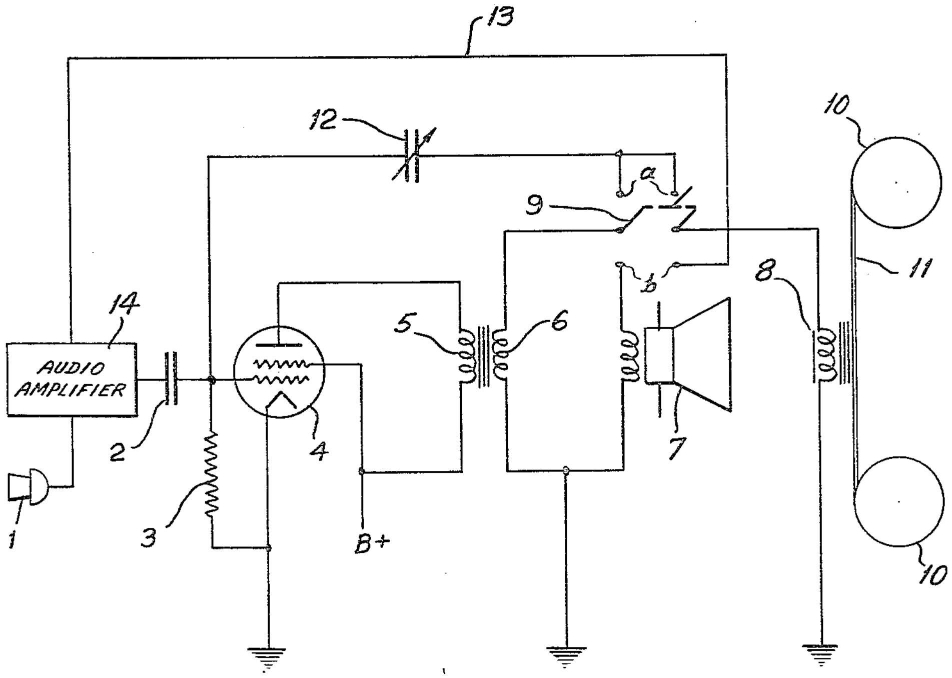
INVENTORS
RALPH WEST
KALJU MERI
BY
Kenyon & Kenyon
ATTORNEYS United States Patent Office 2,810,791

Patented Oct. 22, 1957

2,810,791

RECORD-PLAYBACK SYSTEM FOR MAGNETIC RECORDING

Ralph West, Oceanside, and Kalju Meri, Astoria, N. Y., assignors to Mohawk Business Machines Corporation, New York, N. Y., a corporation of Maryland Application August 19, 1953, Serial No. 375,270

2 Claims. (Cl. 179—100.2)

Small, portable systems for recording voice and other messages on magnetic tapes and playing them back at will have recently become commercially practical and popular. To be of maximum usefulness, these systems must be extremely compact, not only for reasons of cost but also for convenience in handling. The invention herein described substantially promotes that objective by a circuit arrangement which minimizes the equipment required by making it possible for certain elements to perform a plurality of functions hitherto performed by many elements. This not only minimizes equipment costs but also makes it possible to operate with less power, thereby adding to the compactness by minimizing the size of the power source.

The invention will be fully understood from the illustration thereof, shown in the annexed drawing and described in the following text.

A preferable way of recording audio signals magnetically is to superimpose them upon an oscillating carrier current. That, of course, requires an oscillator, in addition to the amplifier means usually required for the audio signal. With the circuit illustrated in the drawing, it is possible to perform both an amplifying and an oscillating function in a single vacuum tube or similar device used for amplifiers and oscillators. At the same time, it is possible for the operator to switch quickly from the condition in which the system is merely reproducing a tape-recording to the condition in which the system is amplifying, oscillating and recording on the tape.

The system shown in the drawing is capable of incorporation in compact, portable units. It may comprise any suitable microphone 1 and any suitable audio amplifier. A signal from the microphone 1 passes through an audio amplifier 14, through the usual condenser 2 and grid resistor 3 to a vacuum tube 4 which serves both as an amplifier and as an oscillator at the will of the operator. The output circuit connected to the tube 4 may comprise the usual transformer arrangement 5 connected between the anode and the screen grid of tube 4 and supplied with B+ power in the usual way. The transformer output from the secondary winding 6 may be applied either to the sound reproducer speaker 7 or to the magnetic transducer 8 by switching the double pole double throw switch 9 between the positions *a* and *b* as desired. Transducer 8, as will be evident hereinafter, is adapted to act alternatively as a recording head or as a pick-up for playback operation.

When the switch 9 is in position *a*, it will supply audio output corresponding to the signal from the microphone source 1 to the transducer 8 acting as a recording head which records it on the magnetic wire or tape medium indicated schematically by the spools 10 and the tape 11. It should be understood that the mechanism includes means for turning the spools in one direction or the other, the spools turning in one direction when it is desired to record a signal and the spools turning in the other direction to rewind the preliminary spool so that the spools may be turned in the original direction again for playing back the recorded signal. At the same time that the switch 9 is in the position *a*, it also connects the output of the tube 4 through the transformer 5 and the secondary winding 6 back to the control grid or input circuit of the tube 4 through a positive or regenerative feedback connection, including the variable condenser 12. The amount of feedback and its phase may be controlled by the setting of this condenser. This feedback will cause the tube 4 and its associate circuit to oscillate at a predetermined, desirable carrier frequency upon which this signal will be carried for recordation on the tape 11.

When the switch 9 is moved to the position *b*, it will be in a position to transmit the output of the tube 4 to the speaker 7 for reproduction. When the switch 9 is in the position *b* and the tape recorder 10 and 11 is being played back and picked up by the transducer 8, acting as a pick-up head, the signal will pass through the connecting line 13 to the audio amplifier 14, to the control grid of the tube 4 for amplification and reproduction by the speaker 7.

With this arrangement, it will be seen that the number of tubes required is minimized to the point where it will be possible to operate the system on batteries a sufficiently long time to be practicable. It will be further seen that no additional oscillator circuit or oscillator coil is necessary to furnish the carrier frequency upon which the audio signal is carried for recordation.

It should be understood that where the word "tape" is used, it is used in the broad sense of including all forms of magnetic-recording media, specifically wire. Moreover, while the word "tube" is used, it also should be construed broadly to mean such devices as transistors which are now becoming commercially practicable. Further where the word "speaker" is used, it should be construed broadly to mean such devices as earphones.

What we claim is:

1. A magnetic recording and playback system comprising an amplifying stage including an input circuit and an output circuit, means to apply audio signals to be recorded to the input circuit of said stage, a sound reproducer, a magnetic transducer for pick-up and recording operation, and means including a selective switching device operative in one switching position to connect the output circuit of said stage to said transducer and simultaneously in positive feedback relation to said input circuit to render said stage oscillatory to produce a relatively high-frequency carrier and to superimpose said audio signals on said carrier for recording by said transducer, and operative in a second switching position to connect said transducer to said input circuit and simultaneously to connect said output circuit to said sound reproducer to play back recorded signals.

2. A magnetic recording and playback system comprising an amplifier stage including an electron discharge tube having an input electrode and an output electrode, an input circuit coupled to said input electrode, and an output transformer having a primary winding coupled to said output electrode and a secondary winding, means to apply audio signals to be recorded to said input circuit, a sound reproducer, a magnetic transducer, a feedback capacitor, and means including a selective switching element operative in one switching position to connect said secondary winding to said transducer and simultaneously through said capacitor in positive feedback relation to said input circuit to render said amplifier stage oscillatory to produce a relatively high frequency carrier on which said audio signals are superimposed, and in a second switching position to connect said transducer to the input circuit of said amplifier and to connect the secondary winding to said reproducer.

References Cited in the file of this patent

UNITED STATES PATENTS

| | | |
|---|---|---|
| 2,540,299 | Shoup | Feb. 6, 1951 |
| 2,654,003 | Dashiell | Sept. 29, 1953 |

FOREIGN PATENTS

| | | |
|---|---|---|
| 880,550 | France | Mar. 25, 1942 |